US012435796B2

United States Patent
Higashidozono et al.

(10) Patent No.: US 12,435,796 B2
(45) Date of Patent: Oct. 7, 2025

(54) FLUID CONTROL VALVE

(71) Applicant: EAGLE INDUSTRY CO., LTD., Tokyo (JP)

(72) Inventors: Hideki Higashidozono, Tokyo (JP); Takuya Kudo, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/687,269

(22) PCT Filed: Sep. 2, 2022

(86) PCT No.: PCT/JP2022/033101
§ 371 (c)(1),
(2) Date: Feb. 27, 2024

(87) PCT Pub. No.: WO2023/033143
PCT Pub. Date: Mar. 9, 2023

(65) Prior Publication Data
US 2024/0369143 A1 Nov. 7, 2024

(30) Foreign Application Priority Data
Sep. 2, 2021 (JP) .................................. 2021-143492

(51) Int. Cl.
*F16K 1/54* (2006.01)
*F16K 1/36* (2006.01)
*F16K 1/42* (2006.01)

(52) U.S. Cl.
CPC .................. *F16K 1/54* (2013.01); *F16K 1/36* (2013.01); *F16K 1/42* (2013.01)

(58) Field of Classification Search
CPC ..... F16K 1/54; F16K 1/36; F16K 1/42; F16K 31/0655
See application file for complete search history.

(56) References Cited

U.S. PATENT DOCUMENTS

| 1,614,002 | A | 1/1927 | Horton | ................. A62C 35/605 |
| 2,267,515 | A | 12/1941 | Wilcox | ............... F16K 31/0627 |

(Continued)

FOREIGN PATENT DOCUMENTS

| CN | 110260001 | 9/2019 | ........... F16K 15/016 |
| CN | 111279076 | 6/2020 | .............. F04B 27/18 |

(Continued)

OTHER PUBLICATIONS

U.S. Appl. No. 18/019,057, filed Jan. 31, 2023, Fukudome et al.

(Continued)

*Primary Examiner* — Patrick C Williams
(74) *Attorney, Agent, or Firm* — HAYES SOLOWAY P.C.

(57) ABSTRACT

Provided is a fluid control valve capable of stabilizing fluid control characteristics. In a fluid control valve including: a valve housing and a valve seat member which include an inflow passage and a discharge passage, and a valve body that is configured to be brought into contact with and separated from the valve seat member and that forms an inner seal portion and an outer seal portion together with the valve seat member. At least one convex portion which projects into a space inside the valve housing formed between the inner seal portion and the outer seal portion.

6 Claims, 7 Drawing Sheets

(56) References Cited

U.S. PATENT DOCUMENTS

| | | | | |
|---|---|---|---|---|
| 3,252,480 | A | 5/1966 | Odendahl | F16K 47/04 |
| 3,360,304 | A | 12/1967 | Adams | B61K 7/12 |
| 3,483,888 | A | 12/1969 | Hugo | F16K 15/046 |
| 3,841,354 | A | 10/1974 | McDonnell | A61M 5/16881 |
| 4,085,921 | A | 4/1978 | Ueda et al. | F16K 31/06 |
| 4,364,615 | A | 12/1982 | Euler | F16C 27/04 |
| 4,579,145 | A | 4/1986 | Leiber | F16H 61/0251 |
| 4,615,358 | A | 10/1986 | Hammond | F15B 13/0402 |
| 4,632,359 | A | 12/1986 | Tooth | F16K 47/02 |
| 4,634,434 | A | 1/1987 | Marino | F16K 47/06 |
| 4,895,192 | A | 1/1990 | Mortenson | F01M 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,060,695 | A | 10/1991 | McCabe | G05D 16/2024 |
| 5,217,047 | A | 6/1993 | McCabe | F16H 16/0251 |
| 5,263,694 | A | 11/1993 | Smith | B60G 15/068 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,155,391 | A | 12/2000 | Kashiwagi et al. | F16F 9/348 |
| 6,161,585 | A | 12/2000 | Kolchinsky | F05D 16/2024 |
| 6,361,283 | B1 | 3/2002 | Ota | F04B 27/1084 |
| 6,481,976 | B2 | 11/2002 | Kimura | F04B 27/1804 |
| 6,550,956 | B1* | 4/2003 | Utracki | B01F 27/2712 138/42 |
| 6,981,689 | B2 | 1/2006 | Mihaylov | F16K 47/12 |
| 7,040,595 | B2 | 5/2006 | Hirota | F16K 31/02 |
| 7,533,687 | B2 | 5/2009 | Uemura | F16K 27/048 |
| 7,726,949 | B2 | 6/2010 | Taguchi | F04B 1/26 |
| 8,021,124 | B2 | 9/2011 | Umemura | F04B 27/1804 |
| 8,079,827 | B2 | 12/2011 | Iwa | F04B 27/1804 |
| 8,225,818 | B1 | 7/2012 | Stephens | F15B 13/0442 |
| 8,651,826 | B2 | 2/2014 | Futakuchi | F04B 27/1804 |
| 8,844,900 | B2 | 9/2014 | Hoppe | F16K 31/061 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16F 1/32 |
| 9,453,518 | B2 | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,323,754 | B2* | 6/2019 | Vu | F16K 1/42 |
| 10,519,944 | B2 | 12/2019 | Taguchi | F04B 27/1804 |
| 10,539,269 | B2 | 1/2020 | Divisi | F16N 7/32 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 11,085,431 | B2 | 8/2021 | Fukudome et al. | F16K 31/06 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0197141 | A1 | 10/2003 | Kajitani | F16L 47/00 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2004/0238772 | A1 | 12/2004 | Bachman et al. | F16K 47/08 |
| 2005/0076959 | A1 | 4/2005 | Yamamoto | F16K 31/0624 |
| 2005/0151310 | A1 | 7/2005 | Rodeffer | F16F 1/32 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2008/0282717 | A1 | 11/2008 | Yukimoto | F25B 41/04 |
| 2009/0108221 | A1 | 4/2009 | Umemura et al. | 251/129.15 |
| 2009/0114871 | A1 | 5/2009 | Iwa | F04B 27/14 |
| 2009/0141584 | A1* | 6/2009 | Boer | F16K 1/36 138/43 |
| 2009/0183786 | A1 | 7/2009 | Iwa | 137/487.5 |
| 2009/0256091 | A1 | 10/2009 | Nordstrom | F16K 31/0613 |
| 2010/0019406 | A1 | 1/2010 | Shoji et al. | F16K 1/34 |
| 2010/0282991 | A1 | 11/2010 | Okamoto | F16K 31/02 |
| 2011/0041941 | A1 | 2/2011 | Sonsterod | F16K 15/14 |
| 2011/0061749 | A1 | 3/2011 | Okamoto | F16K 31/0655 |
| 2011/0089352 | A1 | 4/2011 | Morgan | F16K 11/0716 |
| 2011/0203888 | A1 | 8/2011 | Sonsterod | F16F 9/32 |
| 2012/0056113 | A1 | 3/2012 | Tano | F04B 27/1804 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0130916 | A1 | 5/2014 | Saeki | F16K 31/0613 |
| 2014/0294632 | A1 | 10/2014 | Kondo et al. | 417/434 |
| 2014/0369862 | A1 | 12/2014 | Ota et al. | F04B 27/1804 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1 | 12/2015 | Higashidozono | 137/624.27 |
| 2015/0377107 | A1* | 12/2015 | Fujita | F01N 3/32 251/318 |
| 2016/0053755 | A1 | 2/2016 | Taguchi | F04B 49/22 |
| 2016/0290326 | A1 | 10/2016 | Sugamura | F04B 27/1804 |
| 2017/0248238 | A1* | 8/2017 | Hakoda | F16K 31/0655 |
| 2017/0284562 | A1 | 10/2017 | Hayama | F16K 41/00 |
| 2018/0149395 | A1 | 5/2018 | Takada et al. | F25B 41/06 |
| 2018/0156345 | A1 | 6/2018 | Kanda | F15B 13/0431 |
| 2018/0187793 | A1 | 7/2018 | Futakuchi | F04B 39/08 |
| 2018/0291888 | A1 | 10/2018 | Tonegawa et al. | F04B 49/22 |
| 2019/0162175 | A1 | 5/2019 | Higashidozono | F04B 27/18 |
| 2020/0032781 | A1 | 1/2020 | Higashidozono | F16K 31/0624 |
| 2020/0088178 | A1 | 3/2020 | Fukudome et al. | F16K 31/06 |
| 2020/0309105 | A1 | 10/2020 | Hayama et al. | F04B 27/18 |
| 2020/0318624 | A1 | 10/2020 | Hayama | F04B 27/18 |
| 2020/0325881 | A1 | 10/2020 | Hayama et al. | F04B 27/18 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |
| 2021/0404570 | A1 | 12/2021 | Hayama et al. | F16K 17/04 |

FOREIGN PATENT DOCUMENTS

| | | | |
|---|---|---|---|
| CN | 111316028 | 6/2020 | F16K 31/06 |
| CN | 111417780 | 7/2020 | F04B 27/18 |
| EP | 2594794 | 5/2013 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | 4106576 | 9/1992 | F16K 31/06 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H10220926 | 8/1998 | F25B 41/06 |
| JP | 11287281 | 10/1999 | F16F 9/348 |
| JP | 2000304152 | 11/2000 | F16D 48/02 |
| JP | 2001012534 | 1/2001 | F16F 9/46 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2004003468 | 1/2004 | F04B 27/14 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |

(56) References Cited

FOREIGN PATENT DOCUMENTS

| | | | |
|---|---|---|---|
| JP | 2009115204 | 5/2009 | ............ F16K 31/04 |
| JP | 2009221965 | 10/2009 | ............ F04B 27/14 |
| JP | 2009275550 | 11/2009 | ............ F04B 49/00 |
| JP | 2010019406 | 1/2010 | ............ F16K 31/04 |
| JP | 2010270900 | 12/2010 | ............. F16K 1/00 |
| JP | 2011501798 | 1/2011 | ............ F16K 15/14 |
| JP | 2011525962 | 9/2011 | ................ F16F 9/32 |
| JP | 4822735 | 11/2011 | ............ A43B 23/24 |
| JP | 2012144986 | 8/2012 | ............ F04B 27/14 |
| JP | 2012211579 | 11/2012 | ............ F04B 27/14 |
| JP | 2013024135 | 2/2013 | ............ F04B 27/14 |
| JP | 5167121 | 3/2013 | ............ F04B 27/14 |
| JP | 2013100915 | 5/2013 | ............ F15K 31/06 |
| JP | 2014080927 | 5/2014 | ............ F04B 27/16 |
| JP | 2014092207 | 5/2014 | ............ F16K 31/06 |
| JP | 2014095463 | 5/2014 | ............ F16K 31/06 |
| JP | 2014194180 | 10/2014 | ............ F04B 27/14 |
| JP | 2015055311 | 3/2015 | ............. F16K 1/00 |
| JP | 2015075054 | 4/2015 | ............ F04B 27/14 |
| JP | 20151168 | 5/2015 | ............ F04B 27/14 |
| JP | 2015137546 | 7/2015 | ............ F04B 27/14 |
| JP | 2015152069 | 8/2015 | ............. F16K 1/36 |
| JP | 2015178795 | 10/2015 | ............ F04B 27/14 |
| JP | 5983539 | 8/2016 | ............ F04B 27/18 |
| JP | 2016196825 | 11/2016 | ............ F04B 27/18 |
| JP | 2016196876 | 11/2016 | ............ F04B 27/18 |
| JP | 2016205404 | 12/2016 | ............ F04B 27/18 |
| JP | 6135521 | 5/2017 | ............ F04B 27/18 |
| JP | 2017089832 | 5/2017 | ............ F16K 31/06 |
| JP | 2017180525 | 10/2017 | ............ F16K 31/04 |
| JP | 2018015739 | 2/2018 | ................ C02F 1/46 |
| JP | 2018035840 | 5/2018 | ............ F16K 31/04 |
| JP | 2018115684 | 7/2018 | ............ B60G 17/08 |
| JP | 2018135954 | 8/2018 | ............ F16K 31/06 |
| JP | 2018179087 | 11/2018 | ............ F16K 31/06 |
| JP | 2019131725 | 8/2019 | |
| JP | 2019138473 | 8/2019 | ................ F16K 1/36 |
| JP | 2019167982 | 10/2019 | ................ F16K 1/38 |
| JP | 2020008038 | 1/2020 | ................ F16K 1/36 |
| JP | 2020041606 | 3/2020 | ................ F16K 1/44 |
| SE | 432654 | 4/1984 | ............ F16K 17/105 |
| WO | WO2006090760 | 8/2006 | ............ F04B 27/18 |
| WO | WO2007119380 | 10/2007 | ............ F04B 27/14 |
| WO | WO2009025298 | 2/2009 | ............ F16K 31/06 |
| WO | WO2011114841 | 9/2011 | ............ F04B 27/14 |
| WO | WO2011132438 | 10/2011 | ............ F16K 31/06 |
| WO | WO2012077439 | 6/2012 | ............ F04B 27/14 |
| WO | WO2014098727 | 6/2014 | ................ F16K 1/36 |
| WO | WO2014119594 | 8/2014 | ............ F04B 27/14 |
| WO | WO2014148367 | 9/2014 | ............ F16K 31/06 |
| WO | WO2016194388 | 12/2016 | ............. F16K 1/00 |
| WO | WO2018124156 | 7/2018 | ............ F16K 31/06 |
| WO | WO2019131482 | 7/2019 | ............ F04B 27/18 |
| WO | WO2020110925 | 11/2019 | ............ F04B 27/18 |

OTHER PUBLICATIONS

U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
International Search Report and Written Opinion and International Preliminary Report on Patentability issued in PCT/JP2021/027769, dated Sep. 7, 2021, 24 pages.
International Search Report and Written Opinion and International Preliminary Report on Patentability issued in PCT/JP2021/027762, dated Oct. 5, 2021, 20 pages.
International Search Report and Written Opinion and International Preliminary Report on Patentability issued in PCT/JP2021/027766, dated Sep. 7, 2021, 24 pages.
International Search Report and Written Opinion and International Preliminary Report on Patentability issued in PCT/JP2021/027770, dated Oct. 5, 2021, 20 pages.
International Search Report and Written Opinion and International Preliminary Report on Patentability issued in PCT/JP2021/027772, dated Sep. 21, 2021, 24 pages.
International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
International Search Report and Written Opinion and International Preliminary Report on Patentability issued in PCT/JP2022/033101, dated Sep. 27, 2022, 25 pages.
International Search Report and Written Opinion and International Preliminary Report on Patentability issued in PCT/JP2022/021401, dated Jun. 29, 2022, 17 pages.

* cited by examiner

FLUID CONTROL VALVE

TECHNICAL FIELD

The present invention relates to a fluid control valve used for controlling a working fluid, for example, a fluid control valve having a relief function or the like capable of discharging the working fluid.

BACKGROUND ART

A fluid control valve used to control a working fluid in various industrial fields includes a valve body brought into contact with and separated from a valve seat and can control a flow rate or pressure of a working fluid by adjusting a valve opening degree.

Such a fluid control valve is largely classified into a valve (for example, a pressure reducing valve or the like) which detects a fluid pressure on a secondary side, adjusts a valve opening degree, and restricts a fluid introduction amount from a primary side to control a flow rate, a pressure, or the like of a working fluid on the primary side and a valve which detect a fluid pressure of a working fluid and discharges the working fluid to the outside at a predetermined fluid pressure or more to control a flow rate or a pressure of the working fluid, that is, a valve having a so-called relief function.

In a shock absorber which is an example of a device which uses the fluid control valve having the relief function, the fluid control valve is fluidly connected to a piston chamber and a reservoir chamber of the shock absorber. A piston is disposed in the piston chamber. Accordingly, in the fluid control valve, the valve body is brought into contact with and separated from the valve seat in accordance with a fluid pressure of the piston chamber changing according to the movement of the piston. By using this movement, the shock absorber can control the damping force.

An example of the fluid control valve having the relief function used in the shock absorber is disclosed in Patent Citation 1 or the like. The fluid control valve herein includes a valve housing, a valve body, a valve seat, and biasing means. The valve housing includes an inflow passage which communicates with the piston chamber of the shock absorber and a discharge passage which communicates with the reservoir chamber. That is, in the fluid control valve, the valve body and the valve seat are provided between the inflow passage and the discharge passage. Further, the valve body is biased in a valve closing direction by the biasing force of the biasing means and can maintain a valve closed state. Then, when a high-pressure working fluid flows into the inflow passage, the valve body is separated from the valve seat against the biasing of the biasing means in the fluid control valve. Accordingly, the fluid control valve is configured to discharge the working fluid from the discharge passage.

In the fluid control valve of Patent Citation 1, an annular concave portion is provided in a valve seat member provided with the valve seat. Additionally, in the valve seat member, respectively, an outer radial-side valve seat is provided on the outer radial side of the annular concave portion and an inner radial-side valve seat is provided on the inner radial side of the annular concave portion. In a valve body, an annular concave portion is provided at a position facing the annular concave portion of the valve seat member. An outer radial-side portion of the annular concave portion of the valve body is seated on the outer radial-side valve seat to close a flow passage communicating between the inflow passage and the discharge passage. Further, in this state, an inner radial-side portion of the valve body is closest to the inner radial-side valve seat so that a minute gap is formed between the inner radial-side portion and the inner radial-side valve seat. That is, in the fluid control valve, an annular space is formed by the annular concave portion of the valve body and the annular concave portion of the valve seat member. Accordingly, a fluid pressure of the working fluid flowing from the inflow passage into the space continuously decreases to cause an intermediate pressure particularly at an initial valve opening stage in which the valve body starts to be opened from the valve closed state of the fluid control valve or a final valve closing stage immediately before the valve body is seated on the valve seat. In a valve opening direction of the valve body, a fluid pressure of the inflow passage and a fluid pressure of the space are applied. In this way, it is possible to smoothly change fluid control characteristics at an initial valve opening stage or a final valve closing stage in which the valve opening degree is small.

CITATION LIST

Patent Literature

Patent Citation 1: JP 2011-501798 A (Pages 6 and 7, FIG. 2)

SUMMARY OF INVENTION

Technical Problem

However, in the fluid control valve of Patent Citation 1, since the high-pressure working fluid flows into the inflow passage so that the fluid pressure of the inflow passage increases, the working fluid is discharged from the discharge passage through the space even when the valve opening degree is large. Therefore, since a vortex may be generated by the working fluid in the space depending on the flow rate and pressure conditions of the working fluid and the vortex may destabilize the operation of the valve body, there is a concern that the fluid control characteristics of the fluid control valve may be disturbed.

The present invention has been made in view of such problems and an object thereof is to provide a fluid control valve capable of stabilizing fluid control characteristics.

Solution to Problem

In order to solve the foregoing problems, a fluid control valve according to the present invention is a fluid control valve including: a valve housing; a valve seat member attached to the valve housing, the valve housing and the valve seat member being formed with an inflow passage and a discharge passage, the valve seat member being disposed between the inflow passage and the discharge passage; and a valve body that is configured to be brought into contact with and separated from the valve seat member and that forms an inner seal portion and an outer seal portion together with the valve seat member, wherein at least one convex portion projects into a space inside the valve housing formed between the inner seal portion and the outer seal portion. According to the aforesaid feature of the present invention, since the space is formed between the inner seal portion and the outer seal portion, it is possible to smoothly change fluid control characteristics at an initial valve opening stage or a final valve closing stage in which a valve opening degree is small. Further, since it is possible to suppress the formation of the vortex in the space by the convex portion projecting into the space in a state in which the valve opening degree is large, it is possible to stabilize the valve opening degree and to stabilize fluid control characteristics.

It may be preferable configuration, the convex portion is separated from a facing member in a valve closed state. According to this preferable configuration, a fluid can pass between the convex portion and the valve body or the valve seat member corresponding to the facing member at an initial valve opening stage or a final valve closing stage in which the valve opening degree is small. Further, it is easy to ensure the flow rate of the fluid passing between the convex portion and the facing member even in a state in which the valve opening degree is large.

It may be preferable that the convex portions are formed in both the valve body and the valve seat member. According to this preferable configuration, it is possible to inhibit the formation of the vortex due to the fluid in the space.

It may be preferable that the convex portion formed in the valve body and the convex portion formed in the valve set member face each other. According to this preferable configuration, since the space is divided into the inside and the outside with the convex portion interposed therebetween, it is easy to adjust fluid control characteristics step by step.

It may be preferable that the convex portion is formed in an annular shape. According to this preferable configuration, since it is possible to uniformize the flow rate of the fluid passing between the convex portion and the facing member, it is possible to further stabilize fluid control characteristics.

DESCRIPTION OF EMBODIMENTS

Modes for carrying out a fluid control valve according to the present invention will be described below based on embodiments.

First Embodiment

A fluid control valve according to a first embodiment of the present invention will be described with reference to FIGS. 1 to 5. Additionally, this embodiment will be described by exemplifying a fluid control valve used in a shock absorber, but can also be applied to other uses. Hereinafter, the top and bottom of the fluid control valve when viewed from the front in FIG. 1 will be described as the top and bottom of the fluid control valve. Specifically, a description will be made such that the lower side of the paper where an outer seal portion 60 and an inner seal portion 70 are arranged is the lower side of the fluid control valve and the upper side of the paper where a solenoid 80 is disposed as a drive source is the upper side of the fluid control valve. Further, the outer seal portion 60 is a main valve of a fluid control valve V1 and the inner seal portion 70 is an auxiliary valve which assists the seal function of the main valve.

Figure 1:
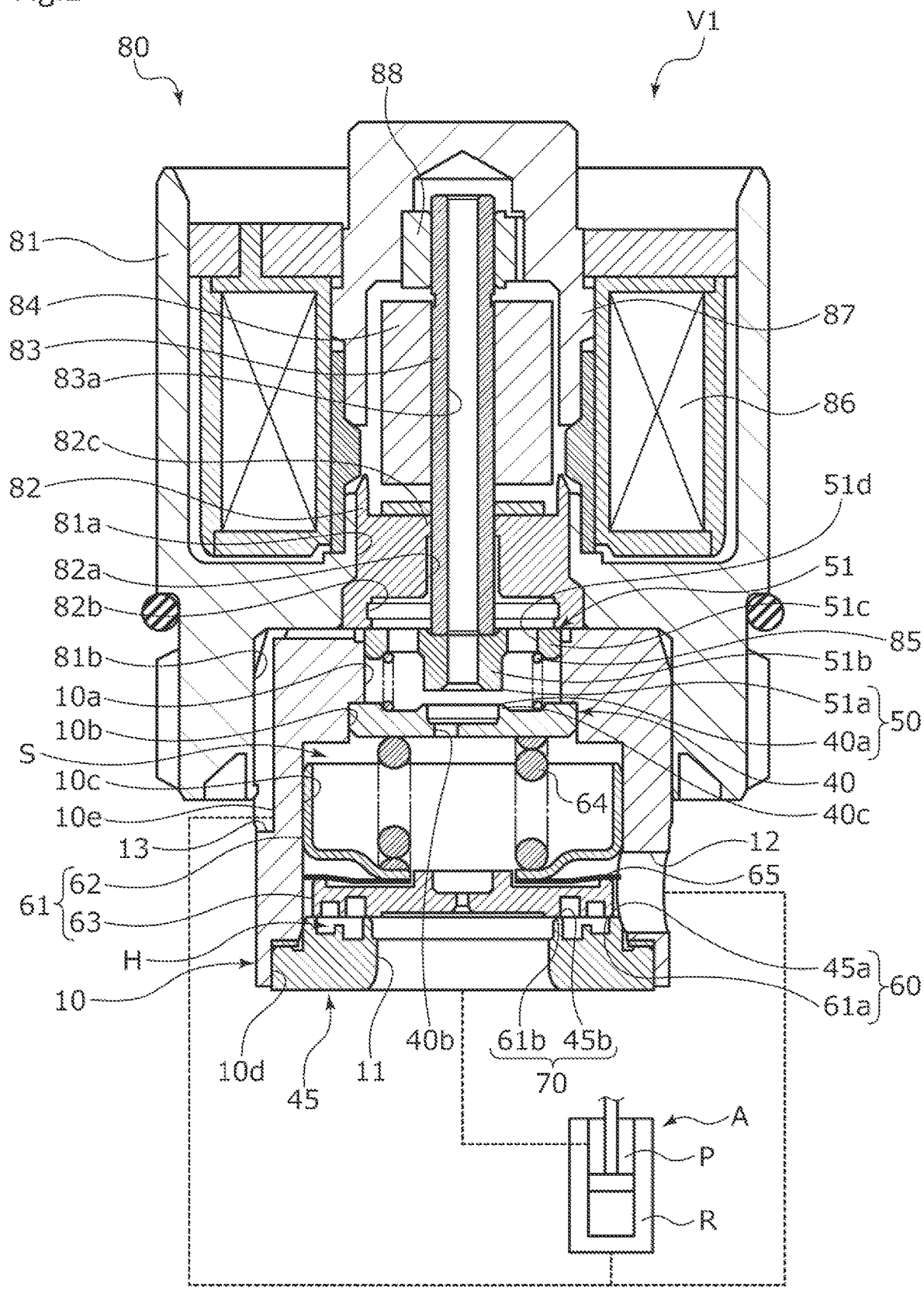
FIG. 1 is a cross-sectional view illustrating a fluid control valve according to a first embodiment of the present invention.

Referring to FIG. 1, a fluid control valve V1 of the present invention is fluidly connected to an absorber piston chamber P and a reservoir chamber R of a shock absorber A.

When the absorber piston moves in the axial direction so that a pressure of a working fluid of an inflow passage 11 increases, the fluid control valve V1 opens the outer seal portion 60 and the inner seal portion 70 so that the working fluid flows out from a discharge passage 12 to the reservoir chamber R. Accordingly, the fluid control valve V1 controls the flow rate of the working fluid flowing from the absorber piston chamber P toward the reservoir chamber R.

Further, in the fluid control valve V1, the fluid control characteristics of the outer seal portion 60 and the inner seal portion 70 are adjusted by a pilot valve 50.

Thus, the fluid control valve V1 controls the damping force of the shock absorber A.

As illustrated in FIG. 1, the fluid control valve V1 mainly includes a valve housing 10, the pilot valve 50, the outer seal portion 60, the inner seal portion 70, and the solenoid 80. Further, the fluid control valve V1 is provided with an annular space H to be described later between the outer seal portion 60 and the inner seal portion 70.

Among these, the pilot valve 50 is disposed at the upper end portion inside the valve housing 10. Further, the outer seal portion 60 and the inner seal portion 70 are arranged below the pilot valve 50 inside the valve housing 10.

The pilot valve 50 includes a pilot valve body 51 and a pilot valve seat 40a. The pilot valve 50 is opened and closed in such a manner that a lower end portion 51a of the pilot valve body 51 is brought into contact with and separated from the pilot valve seat 40a.

The outer seal portion 60 includes a main valve body 61 which is a valve body and an outer radial-side valve seat 45a. The outer seal portion 60 is opened and closed when an outer radial-side lower end portion 61a of the main valve body 61 is brought into contact with and separated from the outer radial-side valve seat 45a.

The inner seal portion 70 includes the main valve body 61 and an inner radial-side valve seat 45b. The inner seal portion 70 is opened and closed when an inner radial-side lower end portion 61b of the main valve body 61 is brought into contact with and separated from the inner radial-side valve seat 45b.

Additionally, in this embodiment, when the outer seal portion 60 is in a valve closed state, a gap between the outer radial-side valve seat 45a and the outer radial-side lower end portion 61a of the main valve body 61 is closed. When the inner seal portion 70 is in a valve closed state, a minute gap is formed between the inner radial-side valve seat 45*b* and the inner radial-side lower end portion 61*b* of the main valve body 61. That is, the inner seal portion 70 functions as an orifice. Accordingly, a working fluid flows from the inflow passage 11 to the space H formed between the outer seal portion 60 and the inner seal portion 70 through the inner seal portion 70 even when the outer seal portion 60 and the inner seal portion 70 are in a valve closed state and a state in which the space H is filled with the working fluid is easily maintained.

First, the solenoid 80 will be described. The solenoid 80 is connected to the valve housing 10 and applies a driving force to the pilot valve body 51.

As illustrated in FIG. 1, the solenoid 80 mainly includes a casing 81, a center post 82, a rod 83, a movable iron core 84, a coil spring 85, a coil 86, a sleeve 87, and a bearing 88.

The casing 81 includes a stepped cylindrical main body portion 81*a* into which the center post 82 is fitted and fixed from the axially lower side.

Further, the casing 81 is provided with an opening portion 81*b* which is continuous to the lower end of the main body portion 81*a* and is opened downward.

The center post 82 is formed in a stepped cylindrical shape from a rigid body formed of a magnetic material such as iron or silicon steel.

The center post 82 includes a cylindrical main body portion 82*a* which extends in the axial direction.

Further, the center post 82 is provided with an opening portion 82*b* which is continuous to the lower end of the main body portion 82*a* and is opened toward the lower side of the center post 82.

The rod 83 is formed in a cylindrical shape. The rod 83 is inserted through the center post 82 and is disposed to reciprocate in the axial direction.

Further, the rod 83 is fitted and fixed to the movable iron core 84. Accordingly, when the solenoid 80 is energized, the rod 83 is moved while following the movable iron core 84 that moves in the valve closing direction. Accordingly, the rod 83 moves the pilot valve body 51 in the valve closing direction, that is, the axially lower side.

Further, the upper end portion of the rod 83 is inserted through the bearing 88 and the lower end portion thereof is inserted through a guide portion 82*c* formed on the inner peripheral surface of the center post 82. The bearing 88 and the guide portion 82*c* guide the axial movement of the rod 83. Therefore, the rod 83 is less likely to tilt in the radial direction when moving in the axial direction.

The coil spring 85 is disposed between a pilot valve seat member 40 and the pilot valve body 51.

The coil spring 85 biases the pilot valve body 51 in the valve opening direction of the pilot valve 50, that is, toward the axially upper side.

The coil 86 is an excitation coil wound around the center post 82 through a bobbin.

The sleeve 87 is formed in a bottomed cylindrical shape. Further, the bearing 88 which guides the movement of the rod 83 is fitted and fixed to the sleeve 87.

Next, a configuration on the side of the valve housing 10 will be described. Components on the side of the valve housing 10 are the valve housing 10, the pilot valve 50, the outer seal portion 60, and the inner seal portion 70.

As illustrated in FIG. 1, the valve housing 10 is formed of a metal material or a resin material and is formed in a cylindrical shape with an inner step.

The valve housing 10 is provided with a cylindrical portion 10*a*, a small-diameter bottomed cylindrical portion 10*b*, a medium-diameter bottomed cylindrical portion 10*c*, and a large-diameter bottomed cylindrical portion 10*d* in order from the axially upper side.

The pilot valve body 51 is inserted into the cylindrical portion 10*a* from the axially upper side.

As illustrated in FIG. 1, the pilot valve body 51 is formed to have a T-shape in cross-section having a cylindrical portion 51*b* and a flange portion 51*c*.

The cylindrical portion 51*b* has a cylindrical shape extending in the axial direction. The lower end portion 51*a* of the cylindrical portion 51*b* is seated on the pilot valve seat 40*a*.

Further, the lower end surface of the rod 83 comes into contact with the upper end portion of the cylindrical portion 51*b*. Accordingly, the pilot valve body 51 which receives the biasing force of the coil spring 85 is pressed against the rod 83.

The flange portion 51*c* has a disk shape that extends radially outward from the upper end portion of the cylindrical portion 51*b*.

Further, the flange portion 51*c* is provided with a communicating passage 51*d* which penetrates in the axial direction. The communicating passage 51*d* communicates the cylindrical portion 10*a* of the valve housing 10 and the opening portion 82*b* of the center post 82.

Further, the outer peripheral surface of the flange portion 51*c* is formed to be movable while sliding on the inner peripheral surface of the cylindrical portion 10*a* of the valve housing 10. Accordingly, the cylindrical portion 10*a* can guide the movement of the pilot valve body 51.

Returning to the configuration of the valve housing 10, the small-diameter bottomed cylindrical portion 10*b* is continuous to the cylindrical portion 10*a* and is recessed toward the axially upper side with a larger diameter inside than the cylindrical portion 10*a*.

The pilot valve seat member 40 press-inserted from the axially lower side is integrally fixed to the small-diameter bottomed cylindrical portion 10*b* in a substantially sealed state.

As illustrated in FIG. 1, the pilot valve seat member 40 is formed of a metal material or a resin material and is formed in a circular plate shape having a communicating passage 40*b* extending therethrough in the axial direction.

Further, an annular convex portion 40*c* which protrudes toward the axially upper side is formed at the center of the upper end portion of the pilot valve seat member 40. The upper end portion of the annular convex portion 40*c* is the pilot valve seat 40*a*.

Returning to the configuration of the valve housing 10, the medium-diameter bottomed cylindrical portion 10*c* is continuous to the small-diameter bottomed cylindrical portion 10*b* and is recessed toward the axially upper side with a larger diameter inside than the small-diameter bottomed cylindrical portion 10*b*.

The main valve body 61 and a coil spring 64 are inserted into the medium-diameter bottomed cylindrical portion 10*c* from the axially lower side. Further, the upper end portion of the main valve seat member 45 which is a valve seat member press-inserted from the axially lower side is integrally fixed to the medium-diameter bottomed cylindrical portion 10*c* in a substantially sealed state.

Additionally, as illustrated in FIG. 1, a pilot control chamber S is formed in a space inside the small-diameter bottomed cylindrical portion 10*b* and the medium-diameter bottomed cylindrical portion 10*c* of the valve housing 10. The pilot control chamber S is defined by the small-diameter bottomed cylindrical portion 10*b*, the medium-diameter bottomed cylindrical portion 10c, the pilot valve seat member 40, the pilot valve body 51, and the main valve body 61.

Figure 2:
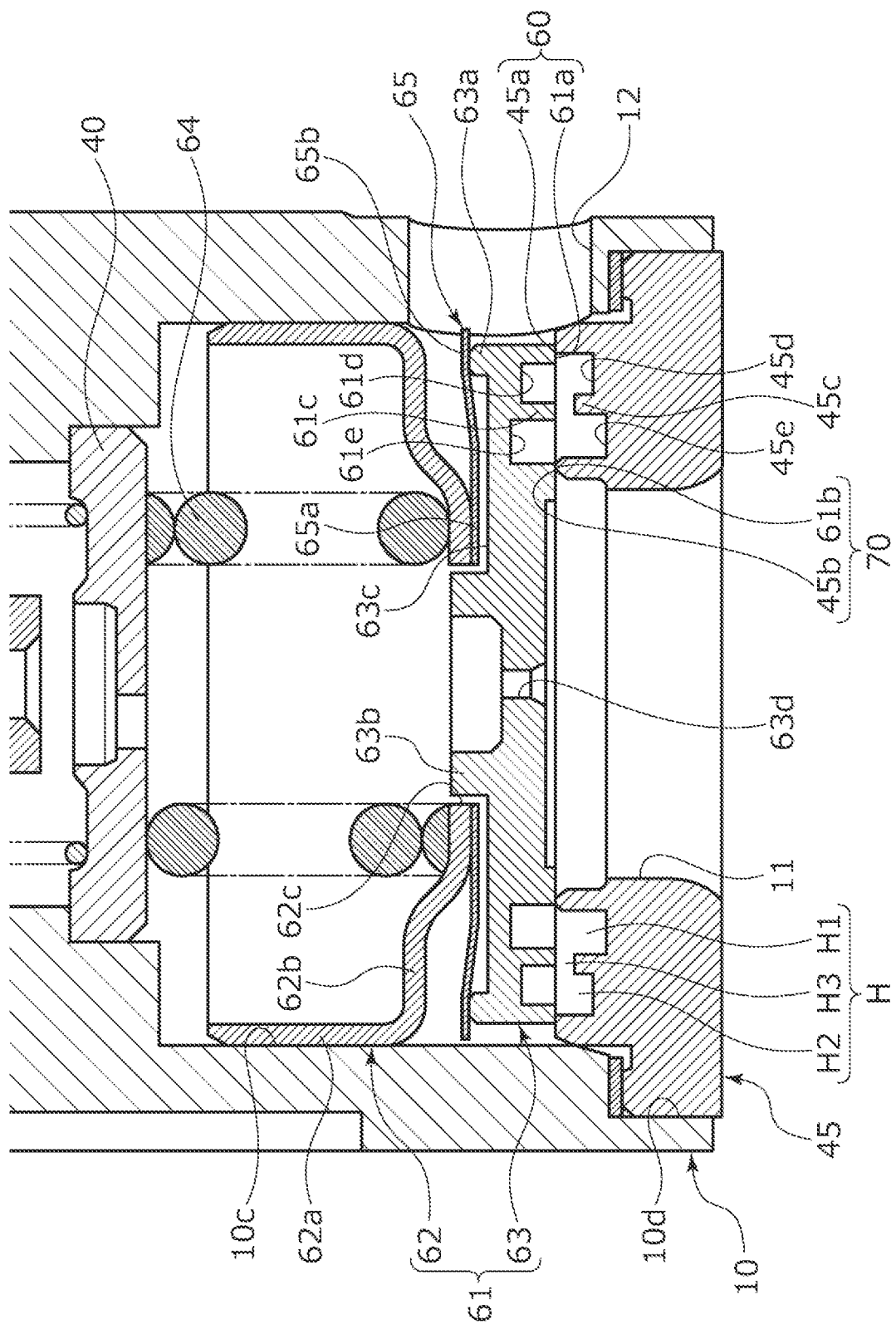
FIG. 2 is an enlarged cross-sectional view illustrating a state in which an outer seal portion is closed and an inner seal portion is substantially closed in the fluid control valve according to the first embodiment.

As illustrated in FIG. 2, the main valve body 61 includes a cylindrical shaped guide member 62 having a substantially U shape in cross-section and a seal member 63. That is, the main valve body 61 is divided into two parts in the axial direction by the guide member 62 and the seal member 63.

The guide member 62 includes a cylindrical portion 62a which extends in the axial direction and a bottom portion 62b which extends radially inward from the lower end portion of the cylindrical portion 62a and a through-hole 62c which penetrates in the axial direction is formed at the center of the bottom portion 62b.

Further, the coil spring 64 which biases the main valve body 61 in the valve closing direction is disposed between the bottom portion 62b of the guide member 62 and the pilot valve seat member 40 in a compressed state. Specifically, the lower end portion of the coil spring 64 is inserted into the guide member 62. Further, a leaf spring 65 which biases the seal member 63 in the valve closing direction is disposed between the guide member 62 and the seal member 63.

Further, in the main valve body 61, the outer peripheral surface of the cylindrical portion 62a of the guide member 62 is formed to be movable while sliding on the inner peripheral surface of the medium-diameter bottomed cylindrical portion 10c of the valve housing 10. Accordingly, the medium-diameter bottomed cylindrical portion 10c can guide the movement of the main valve body 61.

As illustrated in FIG. 2, the seal member 63 includes an annular outer radial-side convex portion 63a which protrudes from the outer radial-side end portion toward the axially upper side and an annular inner radial-side convex portion 63b which protrudes from the radial center portion toward the axially upper side and an annular concave portion 63c is formed between the outer radial-side convex portion 63a and the inner radial-side convex portion 63b. The inner radial-side convex portion 63b is inserted into the through-hole 62c of the guide member 62.

A communicating passage 63d which penetrates in the axial direction is formed at the radial center portion of the seal member 63. Additionally, the inside of the main valve body 61 communicates with the inflow passage 11 through the communicating passage 63d of the seal member 63.

At the lower end portion of the seal member 63, the outer radial-side lower end portion 61a of the main valve body 61 is formed on the outer radial side and the inner radial-side lower end portion 61b of the main valve body 61 is formed on the inner radial side. The outer radial-side lower end portion 61a is seated on the outer radial-side valve seat 45a in the valve closed state of the outer seal portion 60 and the inner radial-side lower end portion 61b approaches the inner radial-side valve seat 45b in the valve closed state of the inner seal portion 70. Additionally, the outer radial-side lower end portion 61a and the inner radial-side lower end portion 61b are formed by an annular convex portion which protrudes toward the axially lower side.

Further, the lower end portion of the seal member 63 is provided with an annular convex portion 61c which protrudes toward the axially lower side between the outer radial-side lower end portion 61a and the inner radial-side lower end portion 61b in the radial direction. Additionally, in this embodiment, the lower end surface of the convex portion 61c is formed on substantially the same plane as the lower end surfaces of the outer radial-side lower end portion 61a and the inner radial-side lower end portion 61b. That is, the lower end surface of the convex portion 61c is formed not to project toward the main valve seat member 45 in relation to the lower end surfaces of the outer radial-side lower end portion 61a and the inner radial-side lower end portion 61b. Additionally, the lower end surface of the convex portion 61c may be located above the lower end surfaces of the outer radial-side lower end portion 61a and the inner radial-side lower end portion 61b.

Further, in this embodiment, the convex portion 61c is formed to have a rectangular cross-section.

Further, the lower end portion of the seal member 63 is provided with an annular concave portion 61d which is recessed toward the axially upper side between the outer radial-side lower end portion 61a and the convex portion 61c and an annular concave portion 61e which is recessed toward the axially upper side between the inner radial-side lower end portion 61b and the convex portion 61c. Additionally, in this embodiment, the inner radial-side annular concave portion 61e is formed to have a larger depth and recess amount than the outer radial-side annular concave portion 61d.

As illustrated in FIG. 2, the leaf spring 65 has a stepped circular ring and plate shape in cross-section, and has a spring constant lower than that of the coil spring 64. Further, the leaf spring 65 is disposed so that an upper end surface of an inner radial plate portion 65a comes into contact with the lower end surface of the bottom portion 62b of the guide member 62 and a lower end surface of an outer radial plate portion 65b comes into contact with the upper end surface of the outer radial-side convex portion 63a of the seal member 63.

Returning to the configuration of the valve housing 10, the large-diameter bottomed cylindrical portion 10d is continuous to the medium-diameter bottomed cylindrical portion 10c and is recessed toward the axially upper side with a larger diameter inside than the medium-diameter bottomed cylindrical portion 10c.

The main valve seat member 45 press-inserted from the axially lower side is integrally fixed to the large-diameter bottomed cylindrical portion 10d in a substantially sealed state.

As illustrated in FIG. 1, the main valve seat member 45 is formed of a metal material or a resin material and is formed in a cylindrical shape having the inflow passage 11 penetrating in the axial direction. The main valve seat member 45 is press-inserted and fixed to the large-diameter bottomed cylindrical portion 10d from the axially lower side through a gasket in a sealed state.

Further, an annular outer radial-side valve seat 45a is formed on the outer radial side and an annular inner radial-side valve seat 45b is formed on the inner radial side at the upper end portion of the main valve seat member 45.

As illustrated in FIG. 2, the upper end portion of the main valve seat member 45 is provided with an annular convex portion 45c which is formed between the outer radial-side valve seat 45a and the inner radial-side valve seat 45b in the radial direction. Additionally, in this embodiment, the upper end surface of the convex portion 45c is formed not to project toward the main valve body 61 in relation to the outer radial-side valve seat 45a and the inner radial-side valve seat 45b. That is, the upper end surface of the convex portion 45c is located below the outer radial-side valve seat 45a and the inner radial-side valve seat 45b.

Further, in this embodiment, the convex portion 45c is formed to have a rectangular cross-section.

Further, the upper end portion of the main valve seat member 45 is provided with an annular concave portion 45d which is recessed toward the axially lower side between the outer radial-side valve seat 45a and the convex portion 45c and an annular concave portion 45e which is recessed toward the axially lower side between the inner radial-side valve seat 45b and the convex portion 45c. Additionally, in this embodiment, the inner radial-side annular concave portion 45e is formed to have a larger depth and recess amount than the outer radial-side annular concave portion 45d.

In this way, in the fluid control valve V1, the annular space H is formed between the outer seal portion 60 and the inner seal portion 70 by the annular concave portions 61d and 61e of the main valve body 61 and the annular concave portions 45d and 45e of the main valve seat member 45. Further, in the space H, the convex portion 61c projects linearly toward the axially lower side from the main valve body 61 and the convex portion 45c projects linearly toward the axially upper side from the main valve seat member 45.

Additionally, in this embodiment, the convex portion 61c which projects linearly toward the axially lower side from the main valve body 61 and the convex portion 45c which projects linearly toward the axially upper side from the main valve seat member 45 face each other in the axial direction and the convex portion 61c and the convex portion 45c which face each other are separated from each other in the axial direction.

Further, as illustrated in FIG. 2, in the space H, an annular space H1 is formed on the inner radial side in relation to the convex portion 61c and the convex portion 45c by the annular concave portion 61e and the annular concave portion 45e. Further, in the space H, an annular space H2 is formed on the outer radial side in relation to the convex portion 61c and the convex portion 45c by the annular concave portion 61d and the annular concave portion 45d. Additionally, the space H1 is formed to be larger than the space H2. Further, in the space H, a space H3 which is an annular gap is formed between the convex portion 61c and the convex portion 45c which are separated from each other in the axial direction. The space H3 communicates the spaces H1 and H2. Additionally, in this embodiment, the space H is divided into three parts by the convex portion, but the space H may be divided into four or more parts by increasing the number of the convex portions.

Returning to FIG. 1, the outer surface of the valve housing 10 is provided with a communicating groove 10e having a downward L-shaped cross-section from the upper end to the side surface of the cylindrical portion 10a.

Further, the lower end portion of the communicating groove 10e is located below the opening portion 81b of the casing 81 and is opened radially outward.

Accordingly, the communicating groove 10e constitutes a pilot side discharge passage 13 of the pilot valve 50.

More specifically, the pilot side discharge passage 13 is formed by the cylindrical portion 10a, the small-diameter bottomed cylindrical portion 10b, and the communicating groove 10e of the valve housing 10, the annular convex portion 40c of the pilot valve seat member 40, the opening portion 81b of the casing 81, and the opening portion 82b of the center post 82.

Further, the valve housing 10 is provided with the discharge passage 12 which extends radially outward from the medium-diameter bottomed cylindrical portion 10c and communicates the inside of the medium-diameter bottomed cylindrical portion 10c and the reservoir chamber R with each other.

Next, the operation of the fluid control valve V1 and mainly the operation of opening and closing the pilot valve 50, the outer seal portion 60, and the inner seal portion 70 will be described with reference to FIGS. 1 to 4.

First, the fluid control valve V1 in the de-energized state will be described. Referring to FIG. 1, in the de-energized state, the pilot valve body 51 of the pilot valve 50 is pressed toward the axially upper side by the biasing force of the coil spring 85. Accordingly, the pilot valve body 51 is separated from the pilot valve seat 40a and the pilot valve 50 is opened. The pilot valve opening degree at this time is maximal in this embodiment.

In the de-energized state, when the shock absorber A is operated so that the pressure of the working fluid in the inflow passage 11 increases, the working fluid flows from the pilot side discharge passage 13 into the reservoir chamber R through the communicating passage 63d of the main valve body 61 and the pilot control chamber S. Along with this, the working fluid may also flow from the discharge passage 12 into the reservoir chamber R according to the pressure of the working fluid as will be described later.

In the fluid control valve V1, the flow passage cross-sectional area of the communicating passage 63d of the main valve body 61 is formed to be narrow. Therefore, even when the pressure of the working fluid in the inflow passage 11 increases, the pressure of the working fluid in the pilot control chamber S is less likely to increase in response to the pressure of the working fluid in the inflow passage 11. Therefore, a differential pressure is generated between the pressure of the working fluid in the inflow passage 11 and the pressure of the working fluid in the pilot control chamber S. As the differential pressure increases, the outer seal portion 60 and the inner seal portion 70 are likely to be opened.

Additionally, in the description below, the pressure of the working fluid in the inflow passage 11 is referred to as the "pressure Pin in the inflow passage 11" and the pressure of the working fluid in the pilot control chamber S is referred to as the "pressure Ps in the pilot control chamber S".

When the differential pressure $\Delta P$ (=Pin−Ps) between the pressure Pin in the inflow passage 11 and the pressure Ps in the pilot control chamber S decreases after the outer seal portion 60 and the inner seal portion 70 are opened, the outer seal portion 60 and the inner seal portion 70 are closed.

The reason why the differential pressure $\Delta P$ decreases is that the working fluid flows from the discharge passage 12 into the reservoir chamber R through the inner seal portion 70, the space H, and the outer seal portion 60 so that the pressure Pin in the inflow passage 11 decreases, the working fluid flows from the communicating passage 63d into the pilot control chamber S so that the pressure Pin in the inflow passage 11 decreases, the volume of the pilot control chamber S is narrowed due to the movement of the main valve body 61 so that the pressure Ps in the pilot control chamber S increases, and the like. Hereinafter, the operation of opening and closing the outer seal portion 60 and the inner seal portion 70 will be described in more detail with specific examples.

Referring to FIG. 2, for example, when the pressure Pin in the inflow passage 11 is smaller than a small pressure P1 (Pin<P1) such as when the absorber piston in the shock absorber A reciprocates with a minute stroke while running on a smooth road surface, the outer radial-side lower end portion 61a of the main valve body 61 is seated on the outer radial-side valve seat 45a and the inner radial-side lower end portion 61b thereof is closest to the inner radial-side valve seat 45b due to the biasing force of the coil spring 64 and the leaf spring 65. That is, the outer seal portion 60 is closed and the inner seal portion 70 is substantially closed.

When the outer seal portion 60 and the inner seal portion 70 are in the valve closed state, a force in which the coil spring 64 biases the guide member 62 downward is larger than a force in which the leaf spring 65 biases the guide member 62 upward. At this time, the inner radial plate portion 65a of the leaf spring 65 and the bottom surface of the annular concave portion 63c of the seal member 63 are separated from each other in the axial direction and serve as a movement allowance for the seal member 63 in the axial direction.

Figure 3:
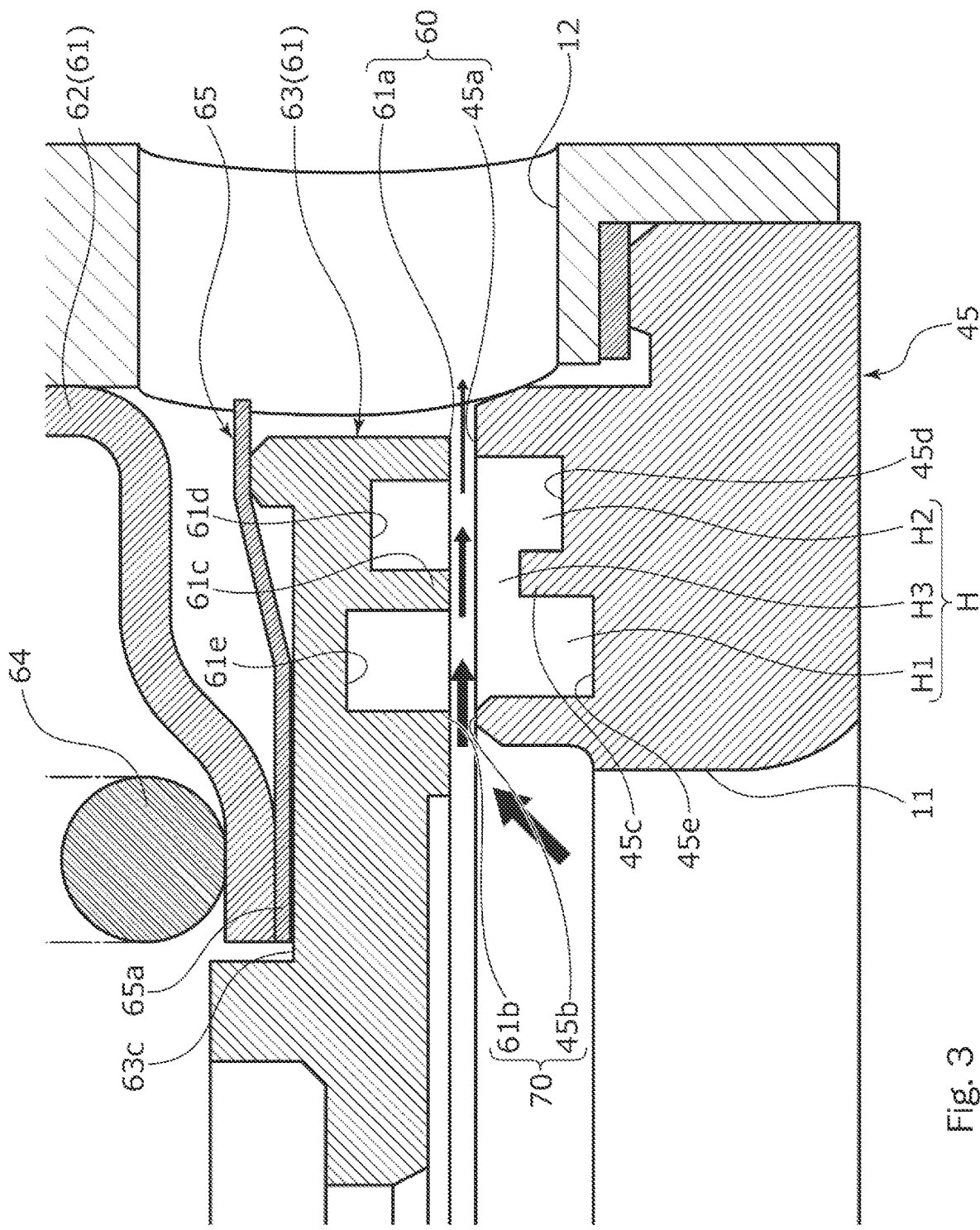
FIG. 3 is an enlarged cross-sectional view illustrating an initial valve opening stage or a final valve closing stage when a leaf spring is compressed to open the outer seal portion and the inner seal portion in the fluid control valve according to the first embodiment.

Referring to FIG. 3, for example, when the pressure Pin in the inflow passage 11 is equal to or larger than a small pressure P2 and smaller than a large pressure P3 (P3>Pin≥P2) such as when the absorber piston in the shock absorber A reciprocates repeatedly with a small stroke while running on an uneven road surface, only the seal member 63 moves toward the axially upper side against the biasing force of the leaf spring 65.

That is, the outer radial-side lower end portion 61a of the main valve body 61 formed at the lower end portion of the seal member 63 is slightly separated from the outer radial-side valve seat 45a and the inner radial-side lower end portion 61b of the main valve body 61 is further separated from the inner radial-side valve seat 45b so that the outer seal portion 60 and the inner seal portion 70 are opened. Accordingly, the working fluid flows from the discharge passage 12 into the reservoir chamber R through the inner seal portion 70, the space H, and the outer seal portion 60 (see a solid arrow in FIG. 3). At this time, since the fluid pressure of the working fluid flowing from the inflow passage 11 into the space H through the inner seal portion 70 continuously decreases to cause an intermediate pressure, the pressure of the working fluid discharged from the space H to the discharge passage 12 through the outer seal portion 60 decreases.

Further, since the space H3 which is an annular gap formed between the convex portion 61c and the convex portion 45c separated from each other in the axial direction functions as a diaphragm in the space H, the fluid pressure of the working fluid flowing from the space H1 into the space H2 through the space H3 is likely to decrease. Further, since the inner radial-side space H1 formed by the annular concave portion 61e and the annular concave portion 45e is larger than the outer radial-side space H2 formed by the annular concave portion 61d and the annular concave portion 45d, the pressure of the working fluid passing through the space H is likely to decrease step by step.

Further, at this time, an excess working fluid in the pilot control chamber S flows from the pilot side discharge passage 13 into the reservoir chamber R as only the seal member 63 moves.

Additionally, since the outer seal portion 60 is closed and the inner seal portion 70 is substantially closed as the differential pressure ΔP decreases as described above, the valve opening degree of the outer seal portion 60 and the inner seal portion 70 increases as the pressure Pin in the inflow passage 11 approaches the large pressure P3 (P3>P2).

Further, when the seal member 63 moves against the biasing force of the leaf spring 65, the lower end surface of the inner radial plate portion 65a of the leaf spring 65 is pressed against the bottom surface of the annular concave portion 63c of the seal member 63. Accordingly, the pressure applied from the working fluid of the inflow passage 11 is likely to be applied to the guide member 62 through the seal member 63.

Figure 4:
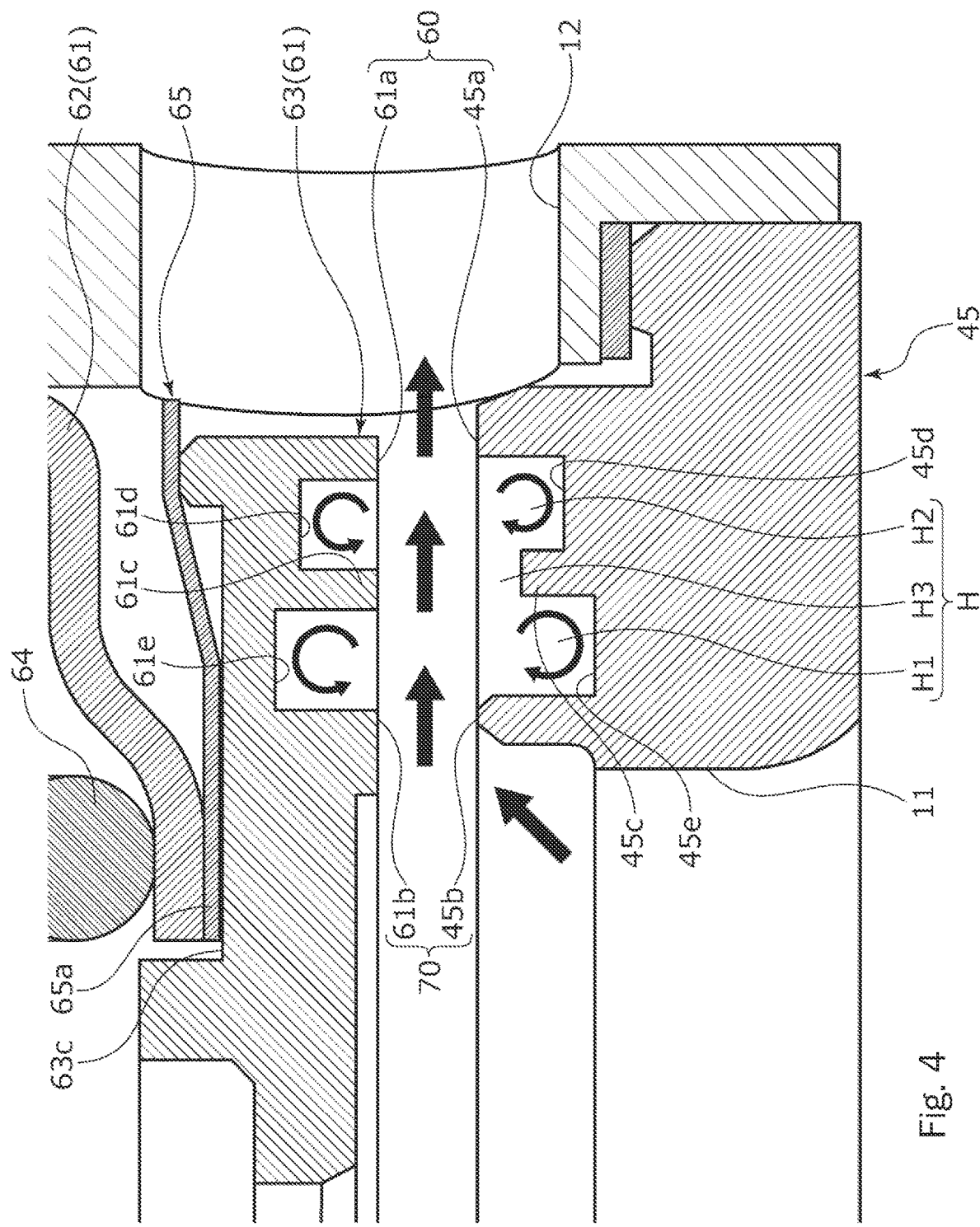
FIG. 4 is an enlarged cross-sectional view illustrating a state in which a coil spring and a leaf spring are compressed to fully open the outer seal portion and the inner seal portion in the fluid control valve according to the first embodiment.

Referring to FIG. 4, for example, when the pressure Pin in the inflow passage 11 is equal to or larger than the large pressure P3 (Pin≥P3) such as when the absorber piston in the shock absorber A tries to make a large stroke to overcome a step on the road surface, the guide member 62 and the seal member 63, that is, the entire main valve body 61 move toward the axially upper side against the biasing force of the coil spring 64 and the leaf spring 65.

That is, the outer radial-side lower end portion 61a of the main valve body 61 is largely separated from the outer radial-side valve seat 45a and the inner radial-side lower end portion 61b of the main valve body 61 is largely separated from the inner radial-side valve seat 45b so that the outer seal portion 60 and the inner seal portion 70 are opened. Accordingly, the working fluid flows from the discharge passage 12 into the reservoir chamber R through the inner seal portion 70, the space H, and the outer seal portion 60 (see a solid arrow in FIG. 4).

Additionally, the valve opening degree of the outer seal portion 60 and the inner seal portion 70 when the pressure Pin in the inflow passage 11 is equal to or larger than the large pressure P3 (Pin≥P3) is maximal in this embodiment.

At this time, the flow rate of the working fluid discharged from the inflow passage 11 to the discharge passage 12 through the inner seal portion 70, the space H, and the outer seal portion 60 increases, but since the convex portion 61c and the convex portion 45c projecting into the space H inhibit the formation of the vortex due to the working fluid in the space H, the generation of the vortex can be suppressed. Specifically, since the space H is divided into the inner radial-side space H1 and the outer radial-side space H2 by interposing the space H3 which is an annular gap formed between the convex portion 61c and the convex portion 45c, it is possible to stabilize the flow of the working fluid formed by the space H1 and the space H2.

Further, since the space H3 which is an annular gap formed between the convex portion 61c and the convex portion 45c separated from each other in the axial direction in the space H increases as the valve opening degree of the outer seal portion 60 and the inner seal portion 70 increases, the space H3 does not function as a diaphragm. Accordingly, it is easy to ensure the flow rate of the working fluid discharged from the inflow passage 11 to the discharge passage 12 through the inner seal portion 70, the space H, and the outer seal portion 60.

Further, an excess working fluid in the pilot control chamber S flows from the pilot side discharge passage 13 into the reservoir chamber R.

Then, when the working fluid flows from the discharge passage 12 into the reservoir chamber R through the inner seal portion 70, the space H, and the outer seal portion 60, the coil spring 64 expands as the pressure Pin in the inflow passage 11 decreases, the valve opening degree decreases, and the pressure Pin in the inflow passage 11 is equal to or larger than the small pressure P2 and smaller than the large pressure P3 (P3>Pin≥P2) as described above, only the seal member 63 moves toward the axially upper side against the biasing force of the leaf spring 65 (see FIG. 3).

Further, when the working fluid flows from the discharge passage 12 into the reservoir chamber R through the inner seal portion 70, the space H, and the outer seal portion 60 and the pressure Pin in the inflow passage 11 is smaller than the small pressure P1 (Pin<P1), the outer radial-side lower end portion 61a in the main valve body 61 is seated on the outer radial-side valve seat 45a and the inner radial-side lower end portion 61b in the main valve body 61 is closest to the inner radial-side valve seat 45b so that the outer seal portion 60 is closed and the inner seal portion 70 is substantially closed.

Next, the control of the damping force by the pilot valve 50 will be mainly described for the fluid control valve V1 in the energized state. Additionally, since the outer seal portion 60 and the inner seal portion 70 are operated in the energized state in substantially the same manner as in the de-energized state, the description thereof will be omitted.

Referring to FIG. 1, when the electromagnetic force generated by applying a current to the solenoid 80 exceeds the biasing force of the coil spring 85 in the energized state (that is, during so-called duty control), the movable iron core 84 is drawn toward the center post 82, that is, toward the axially lower side.

Accordingly, the rod 83 fixed to the movable iron core 84 moves toward the axially lower side together with the pilot valve body 51. Accordingly, the pilot valve 50 is closed when the pilot valve opening degree decreases and a current exceeding a predetermined level is energized.

When the pilot valve opening degree is small compared to the de-energized state, the working fluid in the inflow passage 11 flows from the pilot side discharge passage 13 into the reservoir chamber R in accordance with the operation of the shock absorber A as in the de-energized state. Further, as described above, the working fluid also flows from the discharge passage 12 into the reservoir chamber R depending on the pressure Pin of the inflow passage 11.

Then, the working fluid is less likely to flow from the pilot control chamber S into the pilot side discharge passage 13 as the pilot valve opening degree decreases. Therefore, the differential pressure ΔP between the pressure Pin of the inflow passage 11 and the pressure Ps of the pilot control chamber S is less likely to occur and the outer seal portion 60 and the inner seal portion 70 are less likely to be opened. That is, the damping force of the shock absorber A can be increased.

In other words, when the pilot valve opening degree is maximized, the damping force of the shock absorber A is minimized. That is, the damping force is controlled to be minimized when the fluid control valve V1 is in the de-energized state.

Further, even when the outer seal portion 60 and the inner seal portion 70 are opened, the differential pressure ΔP decreases in a short time as the pilot valve opening degree of the pilot valve 50 decreases. That is, the opening time of the outer seal portion 60 and the inner seal portion 70 is shortened as the pilot valve opening degree of the pilot valve 50 decreases.

For these reasons, the fluid control characteristics of the outer seal portion 60 and the inner seal portion 70 are controlled according to the pilot valve opening degree of the pilot valve 50. Accordingly, the fluid control valve V1 can variably control the damping force of the shock absorber A.

When a high pressure Pin occurs in the inflow passage 11 even when the pilot valve 50 is closed due to a current exceeding a predetermined level, the pilot valve 50 is slightly opened by this working fluid. Accordingly, the working fluid flows from the pilot side discharge passage 13 into the reservoir chamber R similarly to the de-energized state.

In this way, when the pilot valve 50 is closed in the energized state, the fluid control valve V1 is in a state in which the working fluid is most difficult to pass through the pilot valve 50 and the outer seal portion 60 and the inner seal portion 70 are difficult to be opened. Therefore, the fluid control valve V1 can maximize the damping force of the shock absorber A.

Additionally, a current value to be energized to the coil 86 constituting the solenoid 80 is set based on input parameters such as vehicle speed, vehicle acceleration/deceleration, steering angle, road surface condition, and sprung load.

Further, the pilot valve 50 in the open state may be closed by setting a current value equal to or larger than a predetermined value.

Figure 5A:
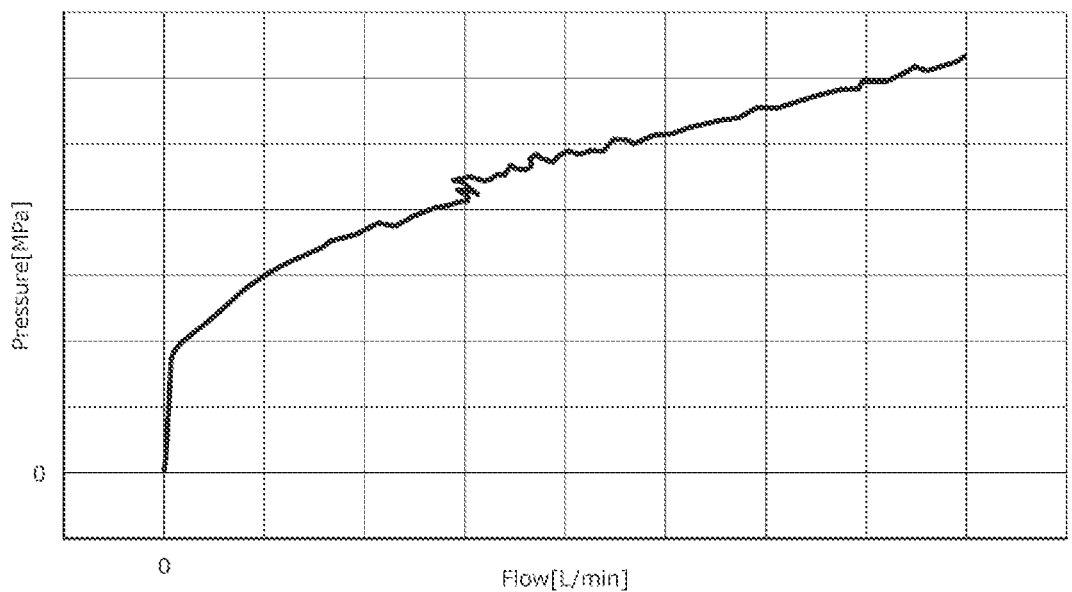
FIG. 5A is a diagram illustrating fluid control characteristics of a conventional fluid control valve and FIG. 5B is a diagram illustrating fluid control characteristics of the fluid control valve according to the first embodiment.
Figure 5B:
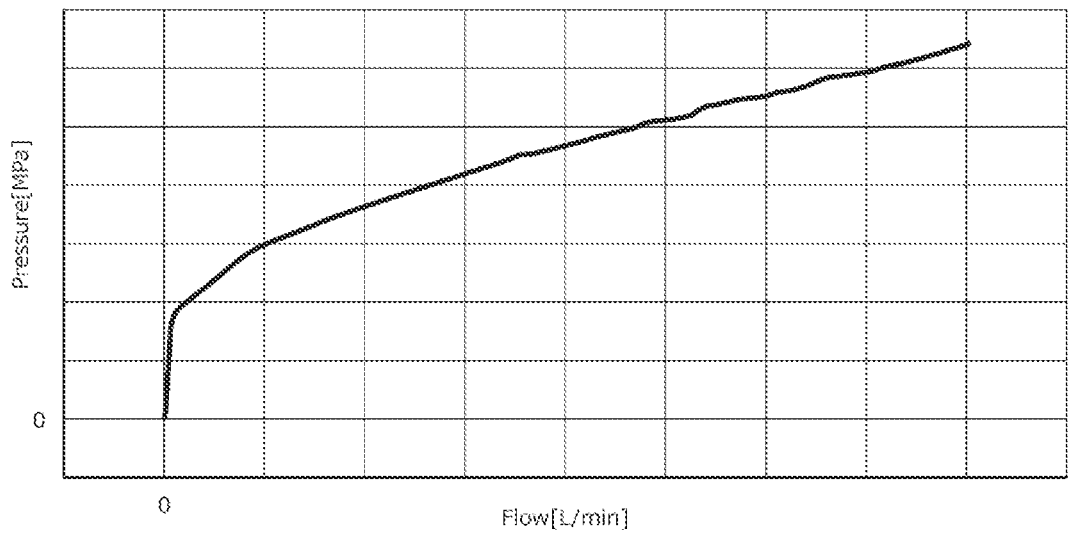

As described above, in the fluid control valve V1 of this embodiment, since the space H is formed between the outer seal portion 60 and the inner seal portion 70, it is possible to smoothly change fluid control characteristics by decreasing the pressure of the working fluid discharged from the inflow passage 11 to the discharge passage 12 through the inner seal portion 70, the space H, and the outer seal portion 60 at an initial valve opening stage or a final valve closing stage in which the valve opening degree is small (see FIG. 3). Further, as illustrated in FIG. 4, since it is possible to suppress the formation of the vortex in the space H by the convex portion 61c and the convex portion 45c projecting into the space H in a state in which the valve opening degree of the outer seal portion 60 and the inner seal portion 70 is large, it is possible to stabilize the valve opening degree of the outer seal portion 60 and the inner seal portion 70 and to stabilize fluid control characteristics. Specifically, as illustrated in FIG. 5B, fluid control characteristics of the fluid control valve V1 of this embodiment can be stabilized compared to fluid control characteristics (see FIG. 5A) of the conventional fluid control valve. Additionally, FIG. 5 is a diagram illustrating the results of measuring fluid control characteristics of the conventional fluid control valve and the fluid control valve V1 of this embodiment under the same conditions such as the current value.

Further, the convex portion 61c and the convex portion 45c are separated from the facing member, that is, the main valve body 61 and the main valve seat member 45 in the valve closed state. Accordingly, the working fluid can pass through the space H3 which is a gap between the convex portion 61c and the convex portion 45c facing each other at an initial valve opening stage or a final valve closing stage in which the valve opening degree of the outer seal portion 60 and the inner seal portion 70 is small. Further, it is easy to ensure the flow rate of the working fluid passing through the space H3 even in a state in which the valve opening degree of the outer seal portion 60 and the inner seal portion 70 is large.

Further, since the convex portion 61c and the convex portion 45c are provided in both the main valve body 61 and the main valve seat member 45, it is possible to inhibit the formation of the vortex due to the working fluid in the space H.

Further, since the convex portion 61c and the convex portion 45c face each other to divide the space H into the inner radial-side space H1 and the outer radial-side space H2 by interposing the convex portion 61c and the convex portion 45c, it is easy to adjust fluid control characteristics step by step.

Further, since the convex portion 61c and the convex portion 45c are formed in an annular shape to uniformize the flow rate of the working fluid passing through the space H3 which is a gap between the convex portion 61c and the convex portion 45c facing each other, it is possible to more stabilize fluid control characteristics. In addition, since the spaces H1 and H2 are formed in an annular shape by the annular concave portions 61d and 61e of the main valve body 61 and the annular concave portions 45d and 45e of the main valve seat member 45 to uniformize the flow rate of the working fluid passing through the space H, it is possible to further stabilize fluid control characteristics.

Further, the lower end surface of the convex portion 61c in the main valve body 61 is disposed to be axially closer to the seal portion in the outer seal portion 60 and the inner seal portion 70 in relation to the convex portion 45c of the facing main valve seat member 45. Accordingly, since the flow of the working fluid in the space H is likely to be biased toward the main valve seat member 45 fixed to the valve housing 10, it is possible to further stabilize the valve opening degree of the outer seal portion 60 and the inner seal portion 70.

Further, when the pressure of the inflow passage 11 increases, the seal member 63 moves against the leaf spring 65 having a lower spring force prior to the guide member 62 and the coil spring 64. When the pressure of the inflow passage 11 is small, as illustrated in FIG. 3, it is possible to move only the seal member 63 without accompanying the movement of the guide member 62 and the coil spring 64 and thus to provide the highly responsive fluid control valve V1.

Second Embodiment

Next, a fluid control valve according to a second embodiment of the present invention will be described with reference to FIG. 6. In addition, the description of the configuration which is the same as and overlaps that of the first embodiment will be omitted.

Figure 6:
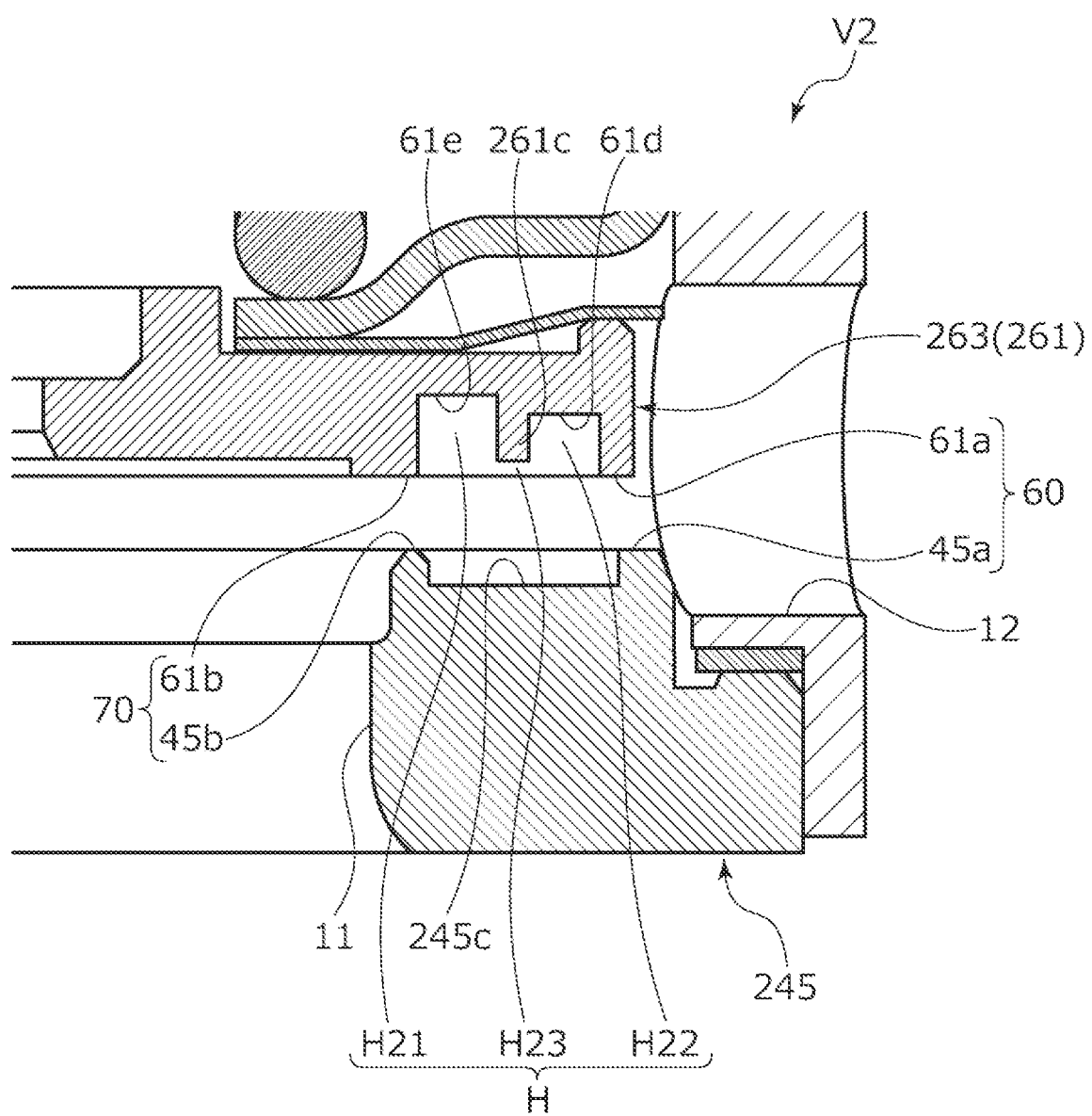
FIG. 6 is an enlarged cross-sectional view illustrating a state in which a coil spring and a leaf spring are compressed to fully open an outer seal portion and an inner seal portion in a fluid control valve according to a second embodiment of the present invention.

As illustrated in FIG. 6, in a fluid control valve V2 according to the second embodiment, the outer radial-side lower end portion 61a of a main valve body 261 is formed on the outer radial side and the inner radial-side lower end portion 61b of the main valve body 261 is formed on the inner radial side at a lower end portion of a seal member 263 constituting the main valve body 261.

Further, an annular convex portion 261c which protrudes toward the axially lower side is formed between the outer radial-side lower end portion 61a and the inner radial-side lower end portion 61b at the lower end portion of the seal member 263. Additionally, in this embodiment, the lower end surface of the convex portion 261c is formed not to project toward the main valve seat member 245 in relation to the lower end surfaces of the outer radial-side lower end portion 61a and the inner radial-side lower end portion 61b. That is, the lower end surface of the convex portion 261c is located above the lower end surfaces of the outer radial-side lower end portion 61a and the inner radial-side lower end portion 61b.

As illustrated in FIG. 6, an annular concave portion 245c is formed between the outer radial-side valve seat 45a and the inner radial-side valve seat 45b at the upper end portion of the main valve seat member 245.

In this way, in the fluid control valve V2, the annular space H is formed between the outer seal portion 60 and the inner seal portion 70 by the annular concave portions 61d and 61e of the main valve body 261 and the annular concave portion 245c of the main valve seat member 245. Further, the convex portion 261c projects linearly toward the axially lower side from the main valve body 261 at the space H.

Additionally, in this embodiment, the convex portion 261c which protrudes linearly toward the axially lower side from the main valve body 261 and the bottom surface of the annular concave portion 245c of the main valve seat member 245 face each other in the axial direction and the convex portion 261c is separated from the bottom surface of the annular concave portion 245c serving as a facing portion in the axial direction when the outer seal portion 60 and the inner seal portion 70 are in the valve closed state (not illustrated).

Further, as illustrated in FIG. 6, an annular space H21 is formed on the inner radial side of the convex portion 261c by the inner radial portions of the annular concave portion 61e and the annular concave portion 245c in the space H. Further, an annular space H22 is formed on the outer radial side of the convex portion 261c by the outer radial portions of the annular concave portion 61d and the annular concave portion 245c in the space H. Additionally, the space H21 is formed to be larger than the space H22. Further, a space H23 which is an annular gap is formed between the convex portion 261c and the bottom surface of the annular concave portion 245c separated from each other in the axial direction in the space H. The space H23 communicates the spaces H21 and H22 with each other.

Accordingly, the main valve seat member 245 can easily form the space H between the outer seal portion 60 and the inner seal portion 70 by forming only one annular concave portion 245c in the main valve body 261.

Additionally, the lower end portion of the convex portion 261c may be formed to enter the annular concave portion when the outer seal portion 60 and the inner seal portion 70 are in the valve closed state by further forming an annular concave portion on the bottom surface of the annular concave portion 245c of the main valve seat member 245 and extending the convex portion 261c of the main valve body 261 downward.

Further, the uneven structures of the main valve body 261 and the main valve seat member 245 may be reversed. Specifically, the space H may be formed by forming only one annular concave portion in the main valve body and forming the convex portion or the annular concave portion in the main valve seat member.

Third Embodiment

Next, a fluid control valve according to a third embodiment of the present invention will be described with reference to FIG. 7. In addition, the description of the configuration which is the same as and overlaps those of the first and second embodiments will be omitted.

Figure 7:
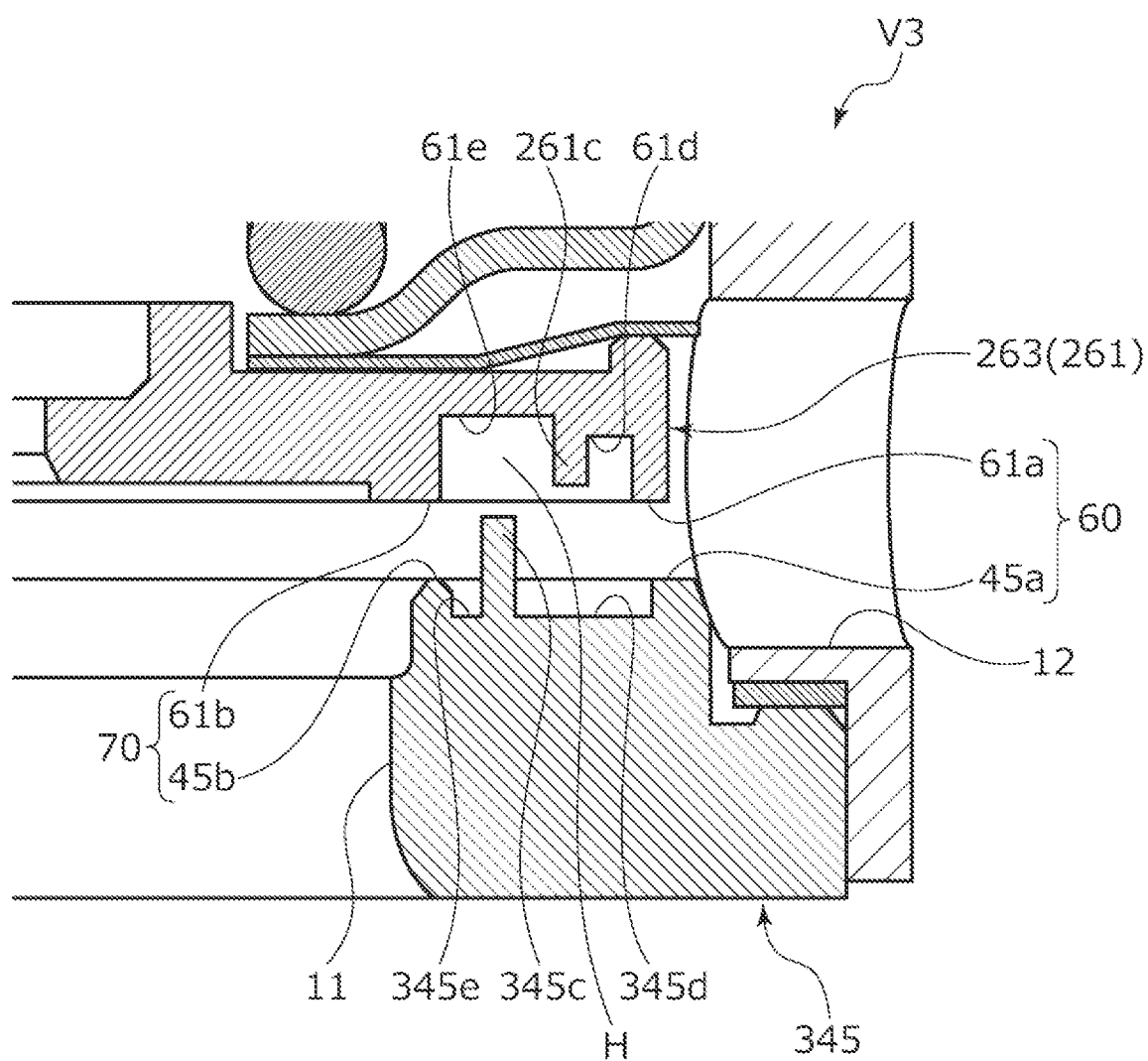
FIG. 7 is an enlarged cross-sectional view illustrating a state in which a coil spring and a leaf spring are compressed to fully open an outer seal portion and an inner seal portion in a fluid control valve according to a third embodiment of the present invention.

As illustrated in FIG. 7, a fluid control valve V3 according to the third embodiment includes the main valve body 261 with the seal member 263 having substantially the same configuration as that of the second embodiment.

An annular convex portion 345c which protrudes toward the axially upper side is formed between the outer radial-side valve seat 45a and the inner radial-side valve seat 45b at the upper end portion of the main valve seat member 345. Further, an annular concave portion 345d which is formed between the outer radial-side valve seat 45a and the convex portion 345c to be recessed toward the axially lower side and an annular concave portion 345e which is formed between the inner radial-side valve seat 45b and the convex portion 345c to be recessed toward the axially lower side are formed at the upper end portion of the main valve seat member 345. Additionally, in this embodiment, the inner radial-side annular concave portions 345d and 345e are formed to have the same depth.

In this way, in the fluid control valve V3, the annular space H is formed between the outer seal portion 60 and the inner seal portion 70 by the annular concave portions 61d and 61e of the main valve body 261 and the annular concave portions 345d and 345e of the main valve seat member 245. Further, in the space H, the convex portion 261c projects linearly toward the axially lower side from the main valve body 261 and the convex portion 345c projects linearly toward the axially upper side from the main valve seat member 345.

Additionally, in this embodiment, the convex portion 261c projecting linearly toward the axially lower side from the main valve body 261 and the bottom surface of the annular concave portion 345d on the outer radial side of the convex portion 345c of the main valve seat member 345 face each other in the axial direction and the convex portion 261c is separated from the bottom surface of the annular concave portion 345d in the axial direction when the outer seal portion 60 and the inner seal portion 70 are in the valve closed state. Further, the convex portion 345c projecting linearly toward the axially upper side from the main valve seat member 345 and the bottom surface of the annular concave portion 61e of the main valve body 261 face each other in the axial direction and the convex portion 345c is separated from the bottom surface of the annular concave portion 61e in the axial direction when the outer seal portion 60 and the inner seal portion 70 are in the valve closed state.

Accordingly, since the convex portion 261c of the main valve body 261 and the convex portion 345c of the main valve seat member 345 projecting into the space H are out of phase in the radial direction to divide the space H into a plurality of small spaces, it is possible to inhibit the formation of the vortex due to the working fluid in the space H.

Additionally, the uneven structures of the main valve body 261 and the main valve seat member 345 may be reversed.

Although the embodiments of the present invention have been described above with reference to the drawings, the specific configuration is not limited to these examples and any changes or additions that do not depart from the scope of the present invention are included in the present invention.

For example, in the above-described embodiments, although it has been described such that the fluid control valve includes the pilot valve and the main valve, the present invention is not limited thereto and the fluid control valve may include only the main valve.

Further, in the above-described embodiments, although it has been described such that the inflow passage and the discharge passage of the housing are formed to allow the working fluid to flow therethrough, the present invention is not limited thereto. For example, a connector may be connected to the inflow passage and the discharge passage of the housing and the working fluid may flow into the housing through the connector. That is, the present invention is not limited to a configuration in which the working fluid directly flows and the inflow passage and the discharge passage may be formed for the inflow or discharge of the working fluid.

Further, in the above-described embodiments, although it has been described such that the outer radial-side valve seat and the inner radial-side valve seat are formed in the main valve seat member separated from the valve housing, the present invention is not limited thereto and at least one valve seat may be integrally formed with the valve housing.

Further, in the above-described embodiments, although it has been described such that the shape of the convex portion protruding from the main valve body or the main valve seat member is a rectangular cross-sectional shape, the present invention is not limited thereto. For example, the convex portion may be formed to have a triangular cross-section or a substantially semi-circular cross-section. Accordingly, since it is possible to guide the flow of the working fluid by forming a tapered surface or a curved surface inclined along the working fluid flowing through the space on the convex portion, it is possible to suppress the generation of a large vortex due to the working fluid in the space.

Further, in the above-described embodiments, although it has been described such that the convex portion protruding from the main valve body or the main valve seat member is separated from the facing member when the outer seal portion and the inner seal portion are in the valve closed state, the present invention is not limited thereto. For example, the convex portion and the facing member may be separated from each other at an initial valve opening stage or a final valve closing stage in which at least the valve opening degree of the outer seal portion and the inner seal portion is small and the convex portion and the facing member may be brought into contact with each other when the outer seal portion and the inner seal portion are in the valve closed state.

Additionally, in the above-described embodiments, although it has been described such that the convex portion projecting linearly from the main valve body or the main valve seat member is provided so that the protruding direction is orthogonal to the flow direction of the working fluid in the space, the present invention is not limited thereto and the protruding direction of the convex portion may be a direction inclined along the working fluid flowing through the space. Further, the convex portion is not limited to the form projecting linearly, but may have a form of projecting in an arc shape or a step shape.

Further, in the above-described embodiments, although it has been described such that the convex portion protruding from the main valve body or the main valve seat member has an annular shape, the present invention is not limited thereto and a plurality of the convex portions may be arranged in the circumferential direction. In this case, it is preferable that the plurality of convex portions be arranged at equal intervals in the circumferential direction.

Further, in the above-described embodiments, although it has been described such that the convex portion protruding from the main valve body or the main valve seat member is integrally formed with the main valve body or the main valve seat member, the present invention is not limited thereto and the convex portion may be formed by a member separated from a portion constituting the outer seal portion and the inner seal portion in the main valve body or the main valve seat member.

REFERENCE SIGNS LIST

10 Valve housing
11 Inflow passage
12 Discharge passage
13 Pilot side discharge passage
40 Pilot valve seat member
45 Main valve seat member (valve seat member, facing member)
45a Outer radial-side valve seat
45b Inner radial-side valve seat
45c Convex portion
45d, 45e Annular concave portion
50 Pilot valve
51 Pilot valve body
60 Outer seal portion
61 Main valve body (valve body, facing member)
61a Outer radial-side lower end portion
61b Inner radial-side lower end portion
61c Convex portion
61d, 61e Annular concave portion
62 Guide member
63 Seal member
64 Coil spring
65 Leaf spring
70 Inner seal portion
H Space
V1 to V3 Fluid control valve

The invention claimed is:

1. A fluid control valve, comprising:
a valve housing;
a valve seat member attached to the valve housing, the valve housing and the valve seat member being formed with an inflow passage and a discharge passage, the valve seat member being disposed between the inflow passage and the discharge passage; and
a valve body that is configured to be brought into contact with and separated from the valve seat member and that forms an inner seal portion and an outer seal portion together with the valve seat member,
wherein at least one convex portion projects into a space inside the valve housing formed between the inner seal portion and the outer seal portion, and
wherein the convex portion is separated from a facing member in a valve closed state.

2. The fluid control valve according to claim 1,
wherein the convex portions are formed in both the valve body and the valve seat member.

3. The fluid control valve according to claim 2,
wherein the convex portion formed in the valve body and the convex portion formed in the valve set member face each other.

4. The fluid control valve according to claim 2,
wherein the convex portion is formed in an annular shape.

5. The fluid control valve according to claim 3,
wherein the convex portion is formed in an annular shape.

6. The fluid control valve according to claim 1,
wherein the convex portion is formed in an annular shape.

* * * * *